United States Patent [19]

Fox

[11] 4,260,167
[45] Apr. 7, 1981

[54] WELL DRILLING TOOL

[75] Inventor: Fred K. Fox, Houston, Tex.

[73] Assignee: Engineering Enterprises, Inc., Houston, Tex.

[21] Appl. No.: 71,797

[22] Filed: Sep. 4, 1979

[51] Int. Cl.³ .......................... F16J 15/34; F16J 15/40
[52] U.S. Cl. ................................. 277/135; 277/81 R; 175/107
[58] Field of Search ................ 277/3, 13, 14 R, 14 V, 277/81 R, 85, 135, 226, 53, 55, 56, 57; 175/107; 415/502

[56] References Cited

U.S. PATENT DOCUMENTS

| | | | |
|---|---|---|---|
| 1,879,625 | 9/1932 | Mendenhall et al. | 277/14 V X |
| 1,879,627 | 9/1932 | Mendenhall et al. | 277/14 V X |
| 2,318,181 | 5/1943 | Myers | 277/135 |
| 3,656,565 | 4/1972 | Fox | 175/102 X |
| 3,659,662 | 5/1972 | Dicky | 277/3 X |
| 3,971,450 | 7/1976 | Fox | 277/87 X |
| 4,019,591 | 4/1977 | Fox | 415/502 X |
| 4,019,592 | 4/1977 | Fox | 175/107 X |

Primary Examiner—Robert S. Ward, Jr.
Attorney, Agent, or Firm—Marvin B. Eickenroht; Jennings B. Thompson

[57] ABSTRACT

There is disclosed a well drilling tool having a body which is connectible as part of a drill string and which includes inner and outer members which are supported for rotation with respect to one another by bearing means contained within a lubricant chamber in an annular space between the members. A series of annular, vertically stacked buckets are carried by the inner and outer members within an annular space above seal means at the upper end of the lubricant chamber, and a body of material which acts as a liquid and is contained within each of at least the upper buckets has a specific gravity substantially greater than that of drilling fluid which is circulated through a portion of the annular space above the lubricant chamber.

26 Claims, 2 Drawing Figures

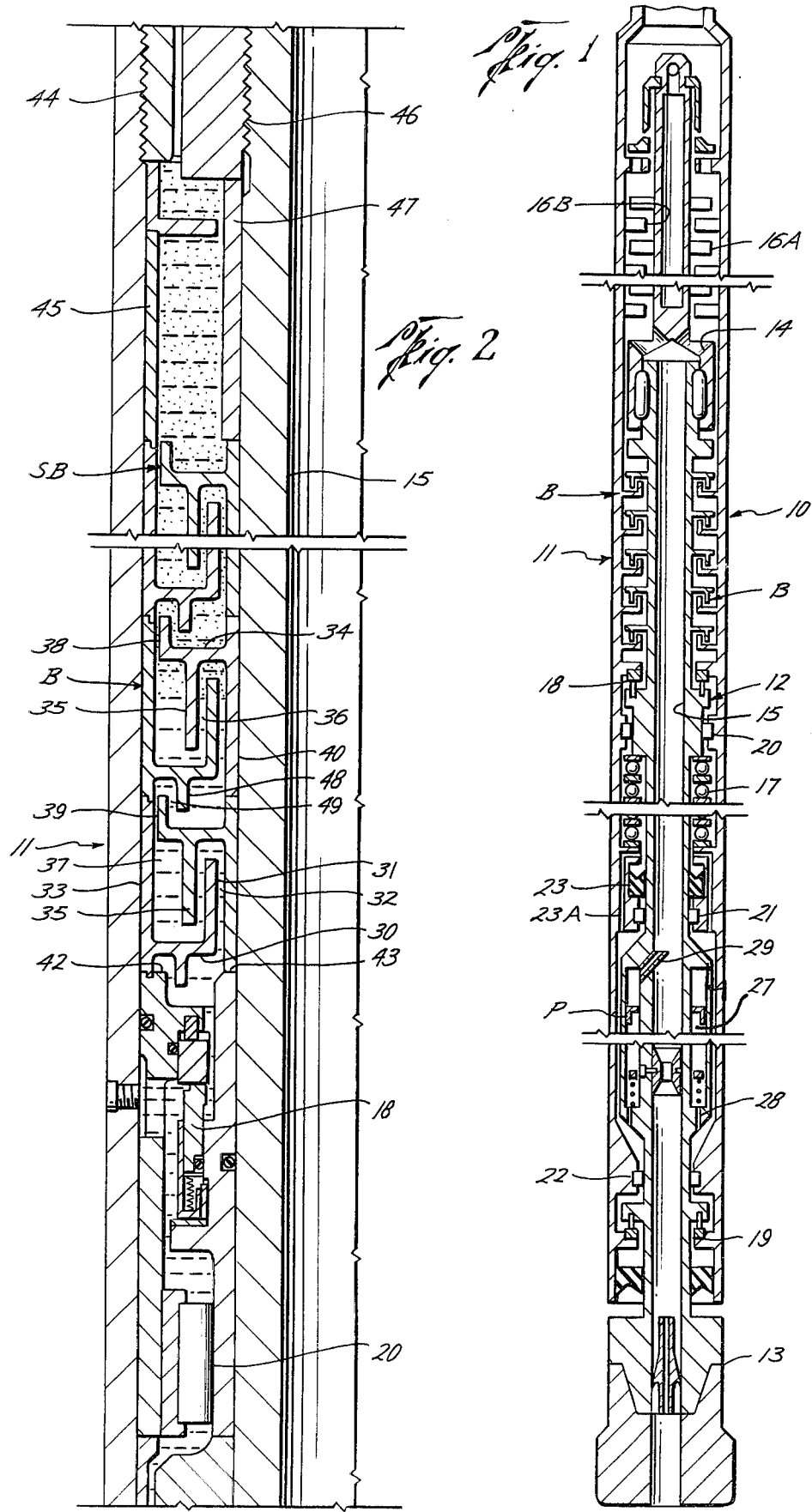

WELL DRILLING TOOL

This invention relates generally to well drilling tools of the type in which a body connectible as part of a drill string includes inner and outer members which are supported for rotation with respect to one another by bearing means contained within a lubricant chamber in an annular space between the members. More particularly, it relates to improvements in tools of this type wherein the upper seal of the lubricant chamber is protected from damage by abrasive particles within drilling fluid circulating through the tool and within the annular space thereabove by means of a body of material disposed within the space which comprises a lubricating grease impregnated with metal particles whose specific gravity is substantially greater than that of the drilling fluid.

In one tool of this general type, as shown for example, in U.S. Pat. No. 3,971,450, the outer member comprises a case suspended from the drill string, the inner member comprises a shaft connected to a drill bit, and a motor is disposed within the annular space between them for rotating the shaft and thus the bit with respect to the case and thus the drill string. In one embodiment of this tool, which is known as a turbodrill, the motor comprises turbine blades arranged on the case and shaft to rotate the shaft in response to circulation of drilling fluid therethrough.

In another tool of this type, which is also shown in U.S. Pat. No. 3,971,450, as well as in U.S. Pat. No. 3,656,565, the shaft from which the drill bit is suspended is in turn suspended from the drill string, the case which surrounds the shaft is caused to rotate with respect thereto by means of a motor disposed within the annular space between them, and the case carries helical blades about its outer diameter which serve to increase the downward force on the bit.

In tools of this type, an effort is made to protect the bearing means from abrasives within the drilling fluid by containing it within a lubricant chamber defined between upper and lower seals. However, it is difficult to prevent the abrasives from getting between the relatively rotating surfaces of the seals and thereby damaging them to such an extent as to permit the heavier drilling fluid and the abrasives carried thereby to pass into the lubricant chamber and the lighter lubricant contained therein. As a result, the bearing means may be so damaged as to require pulling of the tool to replace or repair them.

One purpose of the tools shown in U.S. Pat. No. 3,971,450 was to reduce the normal wear on the seals defining the lubricated bearing chamber by isolating them from the differential pressure of the drilling fluid inside and outside of the tools. Thus, an arrangement was provided in which pressure due to the drilling fluid was substantially balanced across the bearing chamber. Nevertheless, there is some pressure differential across the chamber due to the substantial difference in specific gravity between the drilling fluid above the upper seal and the relatively light lubricant beneath it. Furthermore, the rotating shaft of the tool sets up vibrations creating inertia in the drilling fluid which causes cyclic impulse forces to be exerted on the seal.

U.S. Pat. No. 4,019,591 proposed to alleviate this problem by disposing within the annular space above the seal a body of material which acts as a liquid and which has a specific gravity sufficiently greater than that of the drilling fluid, and is sufficiently insoluble with the drilling fluid, that it substantially excludes drilling fluid from the sealing means. Preferably, this material comprises lubricating grease whose specific gravity is not substantially greater than, and may be actually less than, that of the drilling fluid, but which is impregnated with metal particles whose specific gravity is substantially greater than that of the drilling fluid.

However, additional problems were encountered due to the tendency of the metal particles in the body of material, including abrasive particles in the drilling fluid, to settle out in the grease phase of the material, and thus find their way between the relatively rotating surfaces of the seal to be protected. It is therefore an object of this invention to provide a tool of this type which substantially lessens the likelihood of damaging the seal by reducing the quantity of particles which otherwise might find their way between the sealing surfaces, and further by reducing the force imposed on the seal due to the inertia imparted to the body of material thereabove.

A further object is to provide such a tool which accomplishes the foregoing object in a simple and inexpensive manner, and, more particularly, which may be manufactured by minor modifications and/or additions to existing tools of this type.

Due to its extremely high specific gravity, consideration has been given to use of a body of material comprised of Mercury. However, Mercury is not a good lubricant, and it won't mix well with a lubricating grease. Instead, it will, even after separation due to agitation, tend to reform into large globules. It is therefore another object of this invention to provide a tool of this type having a body of material including a substantial amount of Mercury which mixes well with the lubricating grease.

These and other objects are accomplished, in accordance with the illustrated embodiment of the invention, by a tool of the type described in which a body of such material is contained within at least one annular bucket each carried by one or the other of inner and outer members within the space above the sealing means. For reasons to be explained below, each bucket is preferably carried by the outer member and extends inwardly toward the inner member, although when a plurality of buckets are arranged one above the other, vertically adjacent buckets may be carried by the outer and inner members, respectively, with the upper of the two laterally overlapping the other.

In its preferred form then, each bucket comprises a bottom wall extending laterally inwardly from the outer member or case of the tool and having an inner end which terminates close to the inner member or shaft of the tool, and an annular side wall which extends upwardly from the inner end of the laterally extending wall to define the bucket between its inner wall and the outer member and inner member. Thus, with the exception of that small portion of the annular space disposed within the annular passageway, the bucket is positioned to receive particles which settle out in the body of material, including those which are thrown off and axially outwardly in the annular space above the bucket due to centrifugal force when the inner member is rotated relative to the outer member.

This not only prevents such particles from access to the relatively rotatable sealing surfaces of the upper seal of the bearing chamber, but also isolates the force due to inertia of the heavy material from the seal means, and instead transmits it to the outer member from which the laterally extending wall of the bucket extends. Still further, since the annular side wall of each bucket is disposed close to the inner member, there is a minimum of internal friction in the body of material, and thus a minimum of torque is required to rotate one member with respect to the other.

Preferably, a top wall extends laterally inwardly from the inner member above the upper end of the side wall so as to prevent metal particles settling out of the body of material above the bucket from entering the narrow annular passageway between the side wall and the inner member. The top wall extends laterally inwardly beyond the side wall of the bucket and terminates close to the outer member, and an annular side wall extends upwardly from the outer end of the top wall to provide a secondary bucket between it and the inner member and a narrow annular passageway between it and the outer member, which secondary bucket, like the bucket beneath, is arranged to receive subtantially all of the heavy particles in the annular space above it.

As previously mentioned, there are a series of such buckets and secondary buckets arranged alternately one above the other within the annular space, so as to proportionately lessen the amount of particles to be contained within each such bucket, and further to distribute the load on each bucket. The use of a plurality of vertically arranged buckets, rather than one relatively deep bucket, is further advantageous and desirable in that it simplifies assembly in that it makes it easier to align each bucket with respect to the inner and outer members between which they're disposed. Also, it enables the use of one or more of the lower buckets for containing ordinary lubricant, rather than bodies of relatively high specific gravity material of the type described.

Another annular side wall extends downwardly from each top wall (or bottom wall of each secondary bucket SB) close to the outer side of the side wall of each bucket B beneath it, but terminating short of the bottom wall thereof. This defines a further narrow annular passageway between the side wall and the bucket side wall which connects an outer portion of the bucket with the annular passageway between the bucket and the outer member to which it's connected. Consequently, in order to move out of a bucket B, a particle would have to first move beneath the outermost annular side wall, upwardly through the annular passageway between it and the side wall of the bucket, and then downwardly within the annular passageway between the bucket and the inner member.

More particularly, a further annular side wall extends downwardly from the bottom wall of each bucket B close to the inner side of the upwardly extending side wall of the secondary bucket SB beneath it, but terminating short of the bottom wall of the secondary bucket. Consequently, as in the case above described, a particle which settles out into the secondary bucket must move downwardly and then upwardly and downwardly again before being in a position to move into the bucket beneath it.

As illustrated, the bottom wall of each bucket B extends from a sleeve which fits closely within and is fixed against relative rotation with respect to the outer member. Thus, when there are a series of such buckets, these sleeves are stacked in end-to-end relation to properly locate them one above the other. More particularly, the bottom wall of each secondary bucket SB extends from another sleeve which fits closely about the inner member and is fixed against rotation with respect to it. Thus, when there are a plurality of such secondary buckets, the inner sleeves are stacked one above the other to locate them with respect to one another.

Other objects of this invention are accomplished by a body of material which comprises a lubricating grease impregnated with a substantial amount of Mercury which has been amalgamated by the addition of fine powders of a metal selected from a group consisting of lead, gold, silver and zinc. I have found that this permits the Mercury to be mixed with the grease with much lesser tendency for it to come back together in globules.

In the drawings wherein like reference characters are used throughout to designate like parts:

FIG. 1 is a vertical sectional view of a turbodrill having a stack of buckets constructed and arranged in accordance with the present invention, the turbodrill being discontinued at different levels along its length for purposes of clarity; and FIG. 2 is an enlarged sectional view of one side of the turbodrill of FIG. 1, and showing the buckets disposed within the annular space between the case and shaft above the upper seal of the lubricant chamber for the bearings.

With reference now to the details of the abovedescribed drawings, the overall turbodrill, which is indicated in its entirety by reference character 10, is shown in FIG. 1 to comprise a housing or case 11 having its upper end adapted to be connected to the lower end of a drill string (not shown) and a shaft 12 mounted for rotation within the case and supporting a bit 13 at its lower end. Thus, the case and shaft constitute relatively rotatable outer and inner members which make up a body extending from connection of the upper end of the case with the drill string to connection of the lower end of the shaft with the bit.

As shown in FIG. 1, ports 14 in the shaft connect the upper end of an annular space between the shaft and case with a bore 15 through the shaft connecting its lower end with the bore through the bit. Thus, the case and shaft form a passageway through the body of the tool connecting the well string with the bore, so that when the tool is lowered on the drill string into a wellbore, and drilling fluid is circulated downwardly through the drill string, it passes through the passageway and out the lower end of the bit, and then upwardly within the annulus between the tool and the wellbore.

In the illustrated turbodrill, shaft 12 is rotated with respect to case 11, so as to in turn impart rotation to the bit 13, by means of a turbine section within the annular space above ports 14, and comprising rotors 16A on the outer diameter of the shaft and stators 16B on the inner diameter of the case. As well known in the art, the rotors and stators are so arranged with respect to one another as to cause the shaft and thus the bit to rotate with respect to the case and thus the drill string in response to circulation of drilling fluid downwardly through the turbine section. Axial thrust bearings 17 supporting the shaft for rotation with respect to the case comprise a series of balls or other rolling elements disposed within a lubricant chamber within the annular space between the shaft and case vertically intermediate upper and lower seals 18 and 19.

As indicated diagrammatically in FIG. 1, and as shown, for example, at 18 in FIG. 2, each of the upper and lower seals is preferably of the face type; however, they are reversed end-to-end with respect to one another so that the upper seal 18 is arranged to prevent flow therepast in an upward direction and the lower seal 19 is arranged to prevent flow in a downward direction.

The tool also includes radial bearings 20, 21 and 22 arranged within the lubricant chamber. As shown, the axial bearings 17 and uppermost radial bearings 20 are separated from the remaining bearings in the chamber by means of an intermediate seal made up of one or more cup-type sealing rings of resilient material having upwardly diverging lips on their inner and outer diameters, which permit the flow therepast in an upward direction, but prevent it in a downward direction. An annular passageway 23A in the case bypasses seal 23 to connect the lubricant chamber above and below the intermediate seal, and a check valve (not shown) in such passageway prevents flow therethrough in an upward direction, but permits flow therethrough in a downward direction. In this manner, if lubricant pressure in the portion of the chamber above the intermediate seal exceeds that below it by a predetermined amount, it may be relieved through the check valve.

As also described in the copending application, Ser. No. 033,554, filed Apr. 27, 1979, and entitled WELL DRILLING TOOL, and assigned to the assignee of the present application, an annular space is formed within the shaft to provide a reservoir 27 from which lubricant may be supplied to the lubricant chamber. The lower end of the reservoir is connected to the lubricant chamber by one or more ports 28, and a tube 29 connects the shaft bore 15 with the upper end of the reservoir. Consequently, drilling fluid above and below upper seal 18 is substantially the same pressure, with the differential pressure of the drilling fluid inside and outside of the tool being taken across the lower seal 19.

An annular piston P is sealably slidable within reservoir 27 to separate the upper level of lubricant therein from drilling fluid admitted to the reservoir from bore 15 through the tube 29. The drilling fluid thus constantly urges the piston P in a downward direction, so that if lubricant leaks past the lower seal 19 and out of the lubricant reservoir, additional lubricant is supplied thereto from the reservoir. The pitot tube effect of the upwardly extending tube 29 insures that drilling fluid is applied to the piston at a pressure slightly greater than that which acts over the upper end of seal 18.

As lubricant is supplied from the reservoir to the lubricant chamber, piston P gradually moves downwardly. Although FIG. 1 is discontinuous intermediate the length of the reservoir, the reservoir may be of considerable length. As fully described in the aforementioned pending application, a means is provided to indicate to an operator at the surface when the piston approaches the lower end of the reservoir and thus that the continued use of the tool runs the risk of damaging the bearings.

As previously noted, lubricant within the bearing chamber normally has a specific gravity considerably less than that of the relatively heavy drilling fluid, which commonly includes particles of a high specific gravity material such as barite. Thus, as also previously described, a large downward force may be exerted on the seal 18 defining the upper end of the bearing chamber due to the inertia imparted to the drilling fluid by vibration of the tool. As described in the aforementioned U.S. Pat. No. 4,019,591, it has therefore been proposed to protect this seal from the drilling fluid within the annular space by means of a body of material disposed within such space above the seal which acts as a liquid and comprises a lubricating grease having metal particles of a high specific gravity dispersed therein in order to raise the specific gravity of the body of material to a level greater than that of the drilling fluid.

In accordance with the present invention, a body of such material, which preferably includes a substantial amount of Mercury, as will be described hereinafter, is contained within a series of buckets B arranged one above the other within the annular space above upper seal 18. Each bucket includes a bottom wall 30 which extends laterally inwardly from the case 11 and has an inner end which terminates close to the inner member, and an annular side wall 31 which extends upwardly from the inner end of the bottom wall. Thus, as previously described, the bucket is positioned to receive all particles from the body of material thereabove, except for the small number which may fall into the narrow annular passageway 32 between the bucket side wall and the shaft. More particularly, bottom wall 30 extends inwardly from a sleeve 33 which is received closely within the case 11 and held against relative rotation with respect to the case, as will be described to follow.

A top wall 34 extends laterally outwardly from the shaft above the upper end of the side wall 31 of each bucket, and thus over the upper end of the narrow passageway 32. More particularly, another annular side wall 35 extends downwardly from the top wall 34 and into the bucket close to the outer side of its side wall 31, but terminates short of the bottom wall of the bucket so as to provide a narrow annular passageway 36 between the side walls 31 and 35 which connect the passageway 32 with the inner portion 37 of the bucket.

More particularly, top wall 34 extends laterally outwardly beyond the side wall 35 and terminates close to the case, so as to cover substantially all of the bucket portion 37. Also, another annular side wall 38 extends upwardly from the outer end of top wall 34 to provide secondary bucket SB on its inner side and a narrow annular passageway 39 between it and the case. Thus, there is a minimum of cross-sectional area through which particles in the body of material may pass in order to move into the bucket below each secondary bucket.

Top wall 34 is connected to and extends from a sleeve 40 which is disposed closely about the shaft 12 generally laterally opposite to the sleeve 33 to which bottom wall 30 is connected. As in the case of the outer sleeve 33, and as will be described to follow, inner sleeve 40 is held against relative rotation with respect to the shaft. During assembly, the inner section including top wall 34 and side wall 35 moves downwardly within the bucket as sleeve 40 moves downwardly along the outer side of the shaft into a position generally opposite the sleeve 33.

As shown, there are a plurality of buckets B and secondary buckets SB arranged alternately one above the other, with the lowermost portion of each being spaced above the topmost portion of the bucket beneath it to provide a passageway from one to the other. The inner and outer sleeves of the buckets are stacked one above the other, with the lowermost sleeve 33 resting on an upwardly facing shoulder 42 of the case, and the lowermost inner sleeve 40 being supported on an upwardly facing shoulder 43 of the shaft 12. The vertically-stacked outer sleeves 33 are held down, and thus prevented from rotating with respect to the case, by means of a threaded sleeve 44 of the case which bears on a spacer 45 above the uppermost sleeve. Similarly, the inner sleeves 40 are held down, and thus prevented from rotating with respect to the shaft, by means of a threaded sleeve 46 of the shaft which bears on the upper end of a spacer 47 whose lower end bears on the upper end of the uppermost sleeve.

In the preferred embodiment of the invention, wherein the buckets are stacked one above the other, a further annular side wall 48 depends from the bottom wall 30 of each bucket into the secondary bucket SB beneath it to a level beneath the upper end of upstanding side wall 39. More particularly, wall 38 extends relatively closely within wall 39 so as to provide a relatively narrow passageway 49 between them. Consequently, as in the case of the side wall 35 depending into side wall 48 depending into each secondary bucket requires particles suspended in the body of material thereabove to move downwardly beneath the lower end of side wall 48 and upwardly through passageway 49 in order to enter passageway 39 leading to the bucket beneath it.

In assembly, each bucket is first filled with the body of material before the inner section is moved downwardly into position with respect to it. However, as previously noted, the series of buckets enables at least the lowermost bucket to be filled with ordinary lubricant, rather than with the body of material of high specific gravity. This further protects upper seal 18 from abrasives within the annular space by providing an intermediate body of lubricant through which such particles must flow in order to have access to the rotating sealing surfaces of the upper seal 18.

As previously described, the body of material is preferably comprised of a relatively heavy grease, which may contain carbon or moly additive, impregnated with a substantial amount of Mercury to which fine powders selected from a group of metals consisting of lead, gold, silver and zinc have been added. As previously noted, each of the latter amalgamates the Mercury so as to cause it to go into solution therewith, and thus cause the Mercury to more easily mix with the grease without reassuming globular shapes. I have found that a mixture containing about 65% by weight of Mercury, about 25% by weight of fine powders of a metal selected from the above-described group, and about 10% by weight of a lubricating grease will provide a material having a specific gravity sufficiently higher than that of the ordinarily drilling fluid as to accomplish the overall object of this invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrated and not in a limiting sense.

The invention having been described, what is claimed is:

1. A well drilling tool, comprising a body connectible as part of a well string and including inner and outer members which define an annular space between them through a portion of which drilling fluid is circulated, bearing means within the space supporting one member for rotation with respect to the other, means sealing between the members within the annular space above the bearing means, a bottom wall extending laterally inwardly from the outer member and having an inner end which terminates close the the inner member, and an annular side wall extending upwardly from the inner end of the bottom wall to form an annular bucket between it and the outer member and a narrow annular passageway between it and the inner member which connects the annular space above the bucket with the annular space therebelow, said bucket containing a body of material which acts as a liquid under drilling conditions and which (1) has a specific gravity sufficiently greater than that of the drilling fluid, and (2) is sufficiently insoluble with the drilling fluid, that it substantially excludes drilling fluid from the sealing means.

2. A tool of the character defined in claim 1, including a top wall extending laterally inwardly from the inner member above the upper end of the side wall of the bucket.

3. A tool of the character defined in claim 2, including another annular side wall which extends downwardly from the top wall close to the outer side of the side wall but terminates short of the bottom wall of the bucket, thus providing a narrow annular passageway within said bucket between said other side wall and the side wall of the bucket.

4. A tool of the character defined in claim 3, wherein the top wall extends laterally outwardly beyond the other side wall and terminates close to the outer member, and still another annular side wall extends upwardly from the outer end of the top wall to provide a secondary annular bucket between it and the inner member.

5. A tool of the character defined in claim 4, wherein there are a plurality of buckets and secondary buckets one above the other with the bottom wall of the bucket spaced above the upper end of the side wall of the secondary bucket.

6. A tool of the character defined in claim 5, wherein a further annular side wall extends downwardly from the bottom wall of the bucket close to the inner side of the upwardly extending side wall, and terminating short of the top wall of the secondary bucket.

7. A tool of the character defined in claim 2, wherein the outer end of the top wall extends to a position close to the outer member.

8. A tool of the character defined in claim 7, including another annular side wall extending upwardly from the outer end of the top wall to provide a secondary bucket between it and the inner member and a narrow annular passageway between it and the outer member which connects the secondary bucket and bucket.

9. A tool of the character defined in claim 8, wherein there are a plurality of buckets and secondary buckets one above the other with the bottom wall of each bucket spaced above the end of the side wall of the secondary bucket therebelow.

10. A tool of the character defined in claim 1, wherein there are a plurality of buckets one above the other with the bottom wall of each being spaced above the side wall of the bucket beneath it to provide a passageway between them.

11. A tool of the character defined in claim 2, wherein there are a plurality of buckets one above the other with the bottom wall of each being spaced above the side wall of the bucket beneath it to provide a passageway between them.

12. A tool of the character defined in claim 3, wherein there are a plurality of buckets one above the other with the bottom wall of each being spaced above the side wall portion of the bucket beneath it to provide a passageway between them.

13. A tool of the character defined in claim 1, wherein the bucket includes a sleeve to which the bottom wall is connected, said sleeve being closely received within and fixed against rotation with respect to the outer member, and there are a series of buckets whose sleeves are stacked in end-to-end relation to locate them one above the other.

14. A tool of the character defined in claim 2, wherein the bucket includes a sleeve to which the bottom wall is connected, said sleeve being closely received within and fixed against rotation with respect to the outer member, the top wall is connected to a sleeve closely received about and fixed against rotation with respect to the inner member, and there are a series of buckets whose inner and outer sleeves are stacked in end-to-end relation to locate the bottom wall of each bucket above the top wall therebelow.

15. A well drilling tool, comprising a body connectible as part of a well string and including inner and outer members which define an annular space between them through a portion of which drilling fluid is circulated, bearing means within the space supporting one member for rotation with respect to the other, means sealing between the members within the annular space above the bearing means, and a body of material within the space above the sealing means which comprises (a) a lubricating grease whose specific gravity is no substantially greater than that of the drilling fluid, but which is impregnated with a substantial amount of Mercury which has been amalgamated with fine powders of a metal selected from a group consisting of lead, silver, gold and zinc, so that said material has a specific gravity which is sufficiently greater than that of the drilling fluid, and
   (b) is sufficiently insoluble with the drilling fluid, during drilling operations, that it substantially excludes drilling fluid from the sealing means.

16. A well drilling tool, comprising a body connectible as part of a well string and including inner and outer members which define an annular space between them through a portion of which drilling fluid is circulated, bearing means within the space supporting one member for rotation with respect to the other, means sealing between the members within the annular space above the bearing means, an annular bucket carried by one member and extending therefrom to a position close to the other member to form a narrow annular passageway between the bucket and other member which connects the space above the bucket with the space therebelow, said bucket containing a body of material which acts as a liquid under drilling conditions and which (1) has a specific gravity sufficiently greater than that of the drilling fluid, and (2) is sufficiently insoluble with the drilling fluid, that it substantially excludes drilling fluid from the sealing means.

17. A tool of the character defined in claim 16, including a wall extending laterally from the other member above the upper end of the narrow passageway.

18. A tool of the character defined in claim 16, wherein the one member from which the bucket is carried is the outer member.

19. A tool of the character defined in claim 18, including a wall extending laterally inwardly above the upper end of the narrow passageway.

20. A tool of the character defined in claim 16, wherein the one member from which the bucket is carried is the inner member.

21. A tool of the character defined in claim 20, including a wall extending laterally outwardly above the upper end of the narrow passageway.

22. A tool of the character defined in claim 16, including another annular bucket carried by the other member above the first-mentioned bucket and extending from said other member to a position close to said one member to form a narrow annular passageway between the other bucket and said one member which connects the space above said other bucket with the space therebelow.

23. A tool of the character defined in claim 17, including an annular wall which extends downwardly from the top wall and into but short of the bottom of the bucket.

24. A tool of the character defined in claim 22, including an annular wall which extends downwardly from the upper bucket and into but short of the bottom of the lower bucket.

25. A tool of the character defined in claim 16, wherein the bucket includes a sleeve to which it is connected, said sleeve being closely received within or about and fixed against rotation with respect to the one member, and there are a series of buckets whose sleeves are stacked in end-to-end relation to locate them one above the other.

26. A tool of the character defined in claim 22, one bucket includes a sleeve to which it is connected, said sleeve being closely received within and fixed against rotation with respect to the outer member, the other bucket includes a sleeve to which it is connected, said sleeve being closely received about and fixed against rotation with respect to the inner member, and there are a series of buckets whose inner and outer sleeves are stacked in end-to-end relation to locate the upper bucket above the lower bucket.

* * * * *